(12) United States Patent
Kim et al.

(10) Patent No.: US 11,643,037 B2
(45) Date of Patent: May 9, 2023

(54) SAFE EXIT ASSIST SYSTEM

(71) Applicants: Hyundai Motor Company, Seoul (KR); Kia Motors Corporation, Seoul (KR)

(72) Inventors: Gyun Ha Kim, Incheon (KR); Eung Hwan Kim, Seoul (KR); Sang Kyung Seo, Seoul (KR); Dae Yun An, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 574 days.

(21) Appl. No.: 16/658,702

(22) Filed: Oct. 21, 2019

(65) Prior Publication Data
US 2021/0009064 A1 Jan. 14, 2021

(30) Foreign Application Priority Data
Jul. 8, 2019 (KR) .......... 10-2019-0082050

(51) Int. Cl.
*B60R 21/015* (2006.01)
*B60R 21/0132* (2006.01)
(Continued)

(52) U.S. Cl.
CPC .......... *B60R 21/01566* (2014.10); *B60Q 3/70* (2017.02); *B60R 21/01* (2013.01);
(Continued)

(58) Field of Classification Search
CPC .............. B60R 21/01566; B60R 21/01; B60R 21/0132; B60R 21/0134; B60R 21/01552; B60R 2021/01286; B60Q 3/70; B60Q 9/008; G06V 20/58; G06V 20/59; G06V 20/56; G06T 2207/30261; G06T 2207/30268
See application file for complete search history.

(56) References Cited

U.S. PATENT DOCUMENTS

2013/0314503 A1\* 11/2013 Nix .......................... G06V 20/58
348/46
2017/0210282 A1 7/2017 Rodriguez Barros
(Continued)

OTHER PUBLICATIONS

"What is a TOF Camera?" (http://blog.naver.com/PostView.nhn?blogId=pamtek&logNo=220738289767&parentCategoryNo=&categoryNo=9&viewDate=&isShowPopularPosts=true&from=search).

*Primary Examiner* — Ig T An
(74) *Attorney, Agent, or Firm* — Fox Rothschild LLP

(57) ABSTRACT

A safe exiting assistance system includes an object detector that detects an object which approaches from a rear side of a vehicle, a body detector that detects physical information of a passenger in the vehicle, a door opening/closing detector that detects door opening or closing information of the vehicle, a determiner that determines whether a situation requires alert to the passenger in response to detection results of the object detector and the door opening/closing detector and calculates a value sensed by the body detector in response to vehicle information set in advance, and a controller that differently controls a position and an irradiation angle of a light source in response to the physical information when information in which the alert is necessary is received from the determiner.

20 Claims, 17 Drawing Sheets

(51) Int. Cl.
  *B60R 21/0134* (2006.01)
  *B60Q 3/70* (2017.01)
  *B60R 21/01* (2006.01)
  *G06V 20/58* (2022.01)
  *G06V 20/59* (2022.01)
  *G06T 7/70* (2017.01)

(52) U.S. Cl.
  CPC ...... *B60R 21/0132* (2013.01); *B60R 21/0134* (2013.01); *B60R 21/01552* (2014.10); *G06T 7/70* (2017.01); *G06V 20/58* (2022.01); *G06V 20/59* (2022.01); *B60R 2021/01286* (2013.01); *G06T 2207/30261* (2013.01); *G06T 2207/30268* (2013.01)

(56) References Cited

U.S. PATENT DOCUMENTS

| | | | |
|---|---|---|---|
| 2017/0213459 A1* | 7/2017 | Ogaz | G08G 1/166 |
| 2017/0218678 A1* | 8/2017 | Kothari | E05F 15/40 |
| 2019/0168666 A1* | 6/2019 | Nomura | B60K 37/00 |
| 2019/0322215 A1* | 10/2019 | Tsang | B60R 1/06 |

\* cited by examiner

SAFE EXIT ASSIST SYSTEM

CROSS-REFERENCE TO RELATED APPLICATION

This application claims under 35 U.S.C. § 119(a) the benefit of Korean Patent Application No. 10-2019-0082050, filed in the Korean Intellectual Property Office on Jul. 8, 2019, the entire contents of which are incorporated herein by reference.

BACKGROUND

(a) Technical Field

The present disclosure relates to a safe exiting assistance system, in particular, to the system for informing a passenger in a vehicle as to whether the passenger is capable of exiting safely.

(b) Description of the Related Art

In general, in a case of a vehicle such as a passenger car or a van, when the vehicle stops and a driver or a passenger exits, the driver or the passenger is exposed to dangerous objects such as other vehicles, motorcycles, carts, and bicycles moving on an adjacent road or sidewalk, resulting in possible accidents.

In particular, because vulnerable groups such as the elderly and children may have difficulty paying close attention and/or moving quickly, it is difficult to secure a rear view when exiting a vehicle and to safely exit at a time when no vehicle is approaching.

Therefore, in order to prevent accidents and increase safety for vehicle occupants, a safe exiting system for a vehicle in which a sensor for detecting an object within a certain distance is installed at a vehicle body or a door side of the vehicle to inform of a known danger. The safe exiting system for the vehicle detects the object approaching from a rear side through the sensor when a door is opened or closed in a child lock release state. Accordingly, when the passenger exits, the driver may be notified as to whether the object is approaching through a cluster pop-up, or a warning sound may be generated to inform the passenger as to whether it is safe for the passenger to exit the vehicle.

However, in a cluster pop-up arrangement, a danger warning is not delivered directly to the passenger actually exiting. With a typical warning sound, the passenger may not hear the sound alert in a noisy environment.

SUMMARY

An aspect of the present disclosure may inform whether a passenger exits using a visual warning when the passenger exits.

In particular, an embodiment of the present disclosure may display an alert at an optimum position in consideration of physical information of the passenger.

In addition, an embodiment of the present disclosure may differently display a degree of alert based on a degree of risk of an object approaching when the passenger exits.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a safe exiting assistance system includes an object detector that detects an object which approaches from a rear side of a vehicle, a body detector that detects physical information of a passenger in the vehicle, a door opening/closing detector that detects door opening or closing information of the vehicle, a determiner that determines whether a situation requires alert to the passenger in response to detection results of the object detector and the door opening/closing detector and calculates a value sensed by the body detector in response to vehicle information set in advance, and a controller that differently controls a position and an irradiation angle of a light source in response to the physical information when information in which the alert is necessary is received from the determiner.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
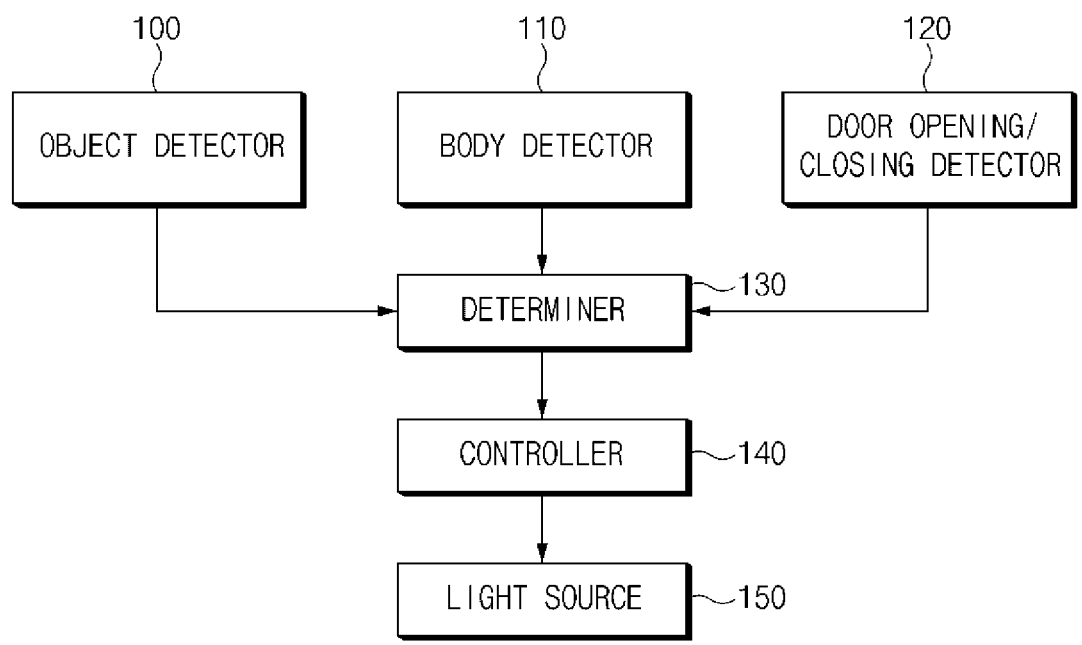
FIG. 1 is a block diagram of a safe exiting assistance system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. It should be noted that, in adding reference numerals to the constituent elements of the drawings, the same constituent elements are denoted by the same reference symbols as possible even if they are shown in different drawings. Further, in the following description of the embodiments of the present disclosure, a detailed description of known functions and configurations incorporated herein will be omitted when it may make the difference that the embodiments of the present disclosure are not conclusive.

FIG. 1 is a block diagram of a safe exiting assistance system according to an embodiment of the present disclosure.

Referring to FIG. 1, an embodiment of the present disclosure includes an object detector 100, a body detector 110, a door opening/closing detector 120, a determiner 130, a controller 140, and a light source 150.

The object detector 100 detects whether an object, which approaches from a rear side of a vehicle, exists and detects a speed at which the object approaches. In an embodiment of the present disclosure, the object detector 100 may include a radar sensor for detecting a distance, a speed, and the like with respect to the object.

The body detector 110 detects physical information of a passenger in the vehicle. Here, the passenger in the vehicle may represent a driver positioned in a driver's seat of the vehicle, a passenger positioned in a front passenger seat, or a passenger positioned in a rear seat. In an embodiment of the present disclosure, it will be described as an example that the passenger in the vehicle represents the passenger positioned in the rear seat.

For example, the body detector 110 senses an eye height of the passenger, a sitting height, or the like to display an alert for a dangerous situation visually at an optimal position when the passenger exits the vehicle. In an embodiment of the present disclosure, it will be described as an example that the body detector 110 senses the eye height of the passenger.

Here, the body detector 110 may include a three-dimensional camera, an IR (infrared) camera, a radar sensor, or the like to sense the eye height of the passenger, but a type of the sensor is not limited thereto.

As an example, as a frequency of the radar sensor increases, a wavelength is shortened to increase a reflectance. The radar sensor has a large amount of radar which does not go through a human body or an object, thereby distinguishing a shape like a camera. The eye height of the passenger may be sensed through the above-described radar sensor.

In an embodiment of the present disclosure, detecting the eye height of the passenger as the physical information has been described as an example, but this is only an example for helping the understanding of the present disclosure, not limited thereto.

The door opening/closing detector 120 detects opening or closing information of a door of the vehicle. In an embodiment of the present disclosure, the door opening/closing detector 120 may include an integrated control unit (ICU), but this is merely an example to help understanding of the present disclosure, and is not limited thereto.

The determiner 130 determines whether a situation requires an alert to the passenger in response to detection results of the object detector 100 and the door opening/closing detector 120. When approach of the object within a certain range is confirmed from the object detector 100 and a door open situation is confirmed from the door opening/closing detector 120, the determiner 130 may determine that the situation requires the alert. In addition, the determiner 130 calculates an eye height in the vehicle in response to a value sensed from the body detector 110 and set vehicle information in advance.

When information indicating that the situation requires the alert from the determiner 130 is received, the controller 140 optimally selects a light source position and an irradiation angle corresponding to the eye height of the passenger. For example, the eye height of the passenger varies depending on a height of the passenger and the alert may be displayed at the eye height of the passenger and therefore the passenger may be accurately informed whether or not to exit. Therefore, the controller 140 may differently set a position where the light source is irradiated and the irradiation angle (irradiation range) for each eye height of the passenger.

The light source 150 may be provided inside the vehicle to visually indicate whether the passenger is capable of exiting when the passenger exits the vehicle. For example, the light source 150 may irradiate a light to a vehicle interior, inside or outside the vehicle door (e.g., a floor) through a spot lamp, thereby display a warning when the passenger exits. In the light source 150, the irradiation angle may be adjusted in response to the eye height of the passenger by control of the controller 140 or an optimal position of the light source 150 may be selected by control the controller 140 when there are several light sources.

In an embodiment of the present disclosure, the light source 150 may be implemented as a light-emitting diode (LED) lamp, a light bulb or a projector. For example, the light source 150 may change a warning display or an alert phrase on a case-by-case basis. To this end, the light source 150 may include a plurality of bulbs and a plurality of LEDs having a specific shape. In addition, the light source 150 may display a warning image and a warning phrase on an object by projecting the light of the door spot lamp.

Figure 2A:
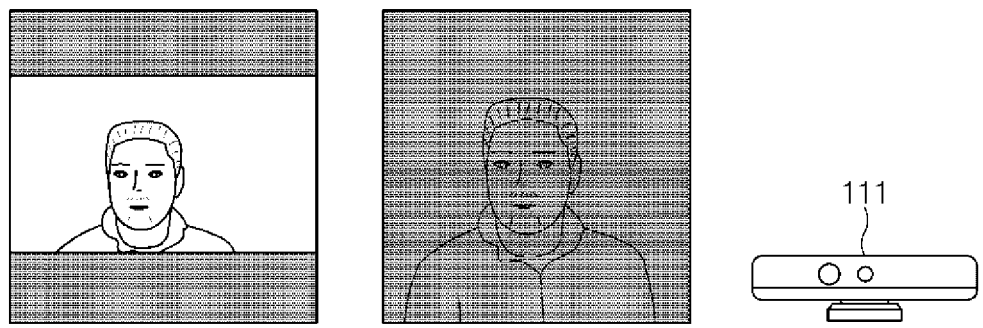
FIGS. 2A to 2C are views illustrating an embodiment of the body detector of FIG. 1.
Figure 2B:
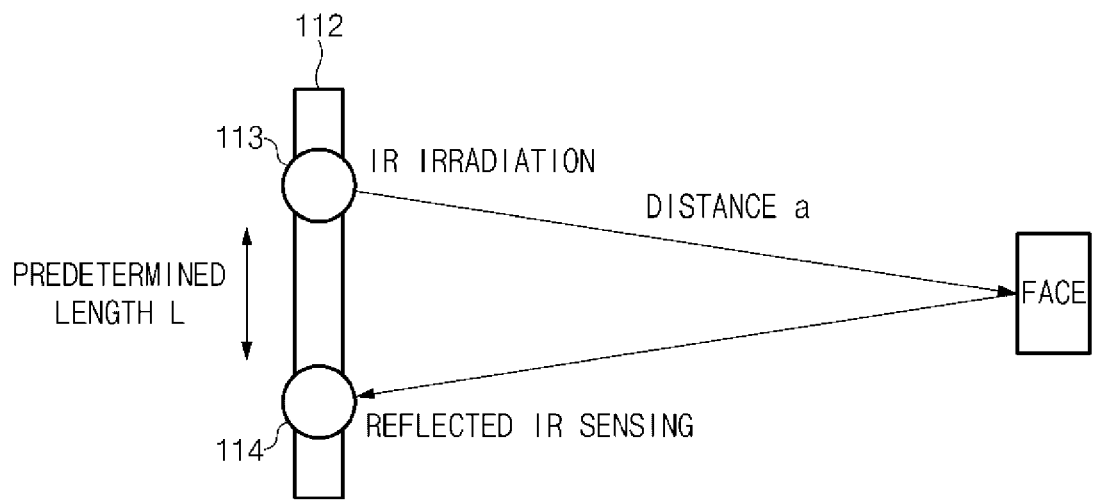
Figure 2C:
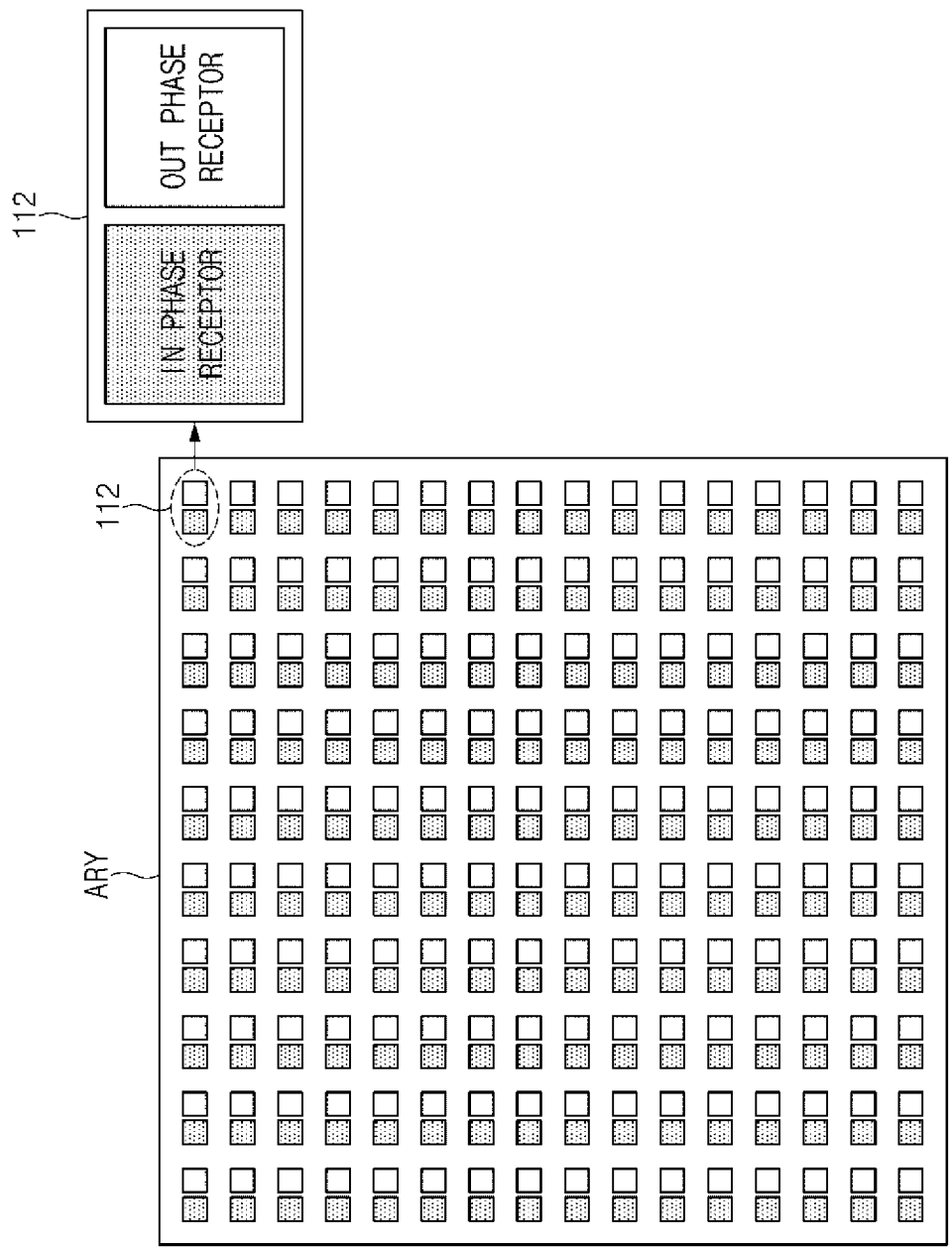

FIGS. 2A to 2C are views illustrating an embodiment of the body detector 110 of FIG. 1.

The body detector 110 according to an embodiment of FIGS. 2A to 2C shows an example for sensing the eye height of the passenger using an IR camera 111 among the above-described examples.

FIG. 2A shows a screen in which a face of a person is photographed using an IR light source of the IR camera 111. The IR camera 111 is capable of tracking a pupil or an eye ball through physical characteristics of the person.

FIG. 2B illustrates an example in which the IR camera 111 includes a time of flight (TOF) camera.

A distance "a" from the IR light source to the face of the person may be measured using the TOF camera. A sensor 112 includes an irradiator 113 and a reflector 114, which are spaced apart at a predetermined length "L". The sensor 112 irradiates the IR light to the face of the person through the irradiator 113. A distance from the irradiator 113 to the face of the person is equal to "a". The reflector 114 senses an IR reflected wave reflected from the face of the person.

As described above, the sensor 112 may measure a time "t" until the IR light irradiated from the irradiator 113 reaches the reflector 114 to measure the distance "a" in a three-dimension.

FIG. 2C is a detailed configuration diagram of the sensor 112. In the sensor 112, the irradiator 113 and the reflector 114 are implemented as a pair of pixels, and a plurality of pixels are arranged in an array ARY in a row and column directions.

A pair of sensors 112 may measure a flight time (irradiation time+reflection time) of the IR light to be converted into a distance. In the pair of sensors 112, an in phase receptor receives a time at which the IR light is turned on and an out phase receptor receives a time at which the IR light is turned off. Accordingly, the sensor 112 may measure the distance between an object and the sensor 112 using a principle of times to receive the light at the in phase receptor and the out phase receptor are varied depending on the distance.

Figure 3:
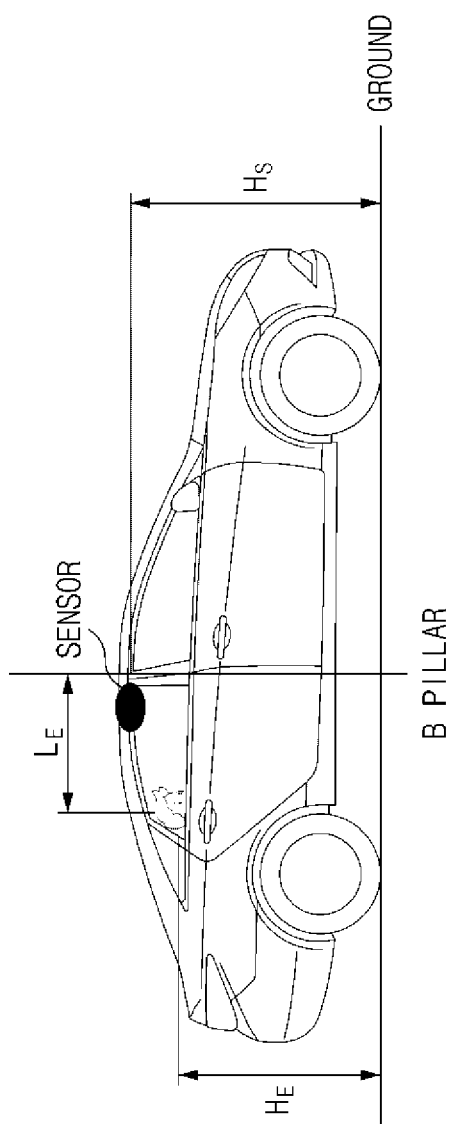
FIG. 3 is a view for illustrating an operation of the determiner of FIG. 1.

FIG. 3 is a view for illustrating an operation of the determiner 130 of FIG. 1.

Referring to FIG. 3, the determiner 130 may calculate the eye height of the passenger in the vehicle based on the vehicle information sensed in advance in the vehicle and the body information sensed by the body detector 110.

For example, the vehicle information sensed in advance in the vehicle may include a position of a B pillar, a position of an object inside the vehicle, a height of the light source, position information of the sensor, and the like.

Here, the position of the B pillar, the position of the object inside the vehicle are values input to the sensor at a factory stage for each vehicle type in advance. The height of the light source refers to a height from a ground to the light source. The position information of the sensor (HS) refers to a height from the ground to the sensor and a coordinate. Here, the sensor represents a position detection sensor capable of measuring the position of the passenger.

In addition, the body information sensed by the body detector 110 may include eye height information HE and a length information LE from the passenger's eyes to the B pillar. Here, the eye height information HE indicates a distance from the ground to the eye of the passenger.

Figure 4:
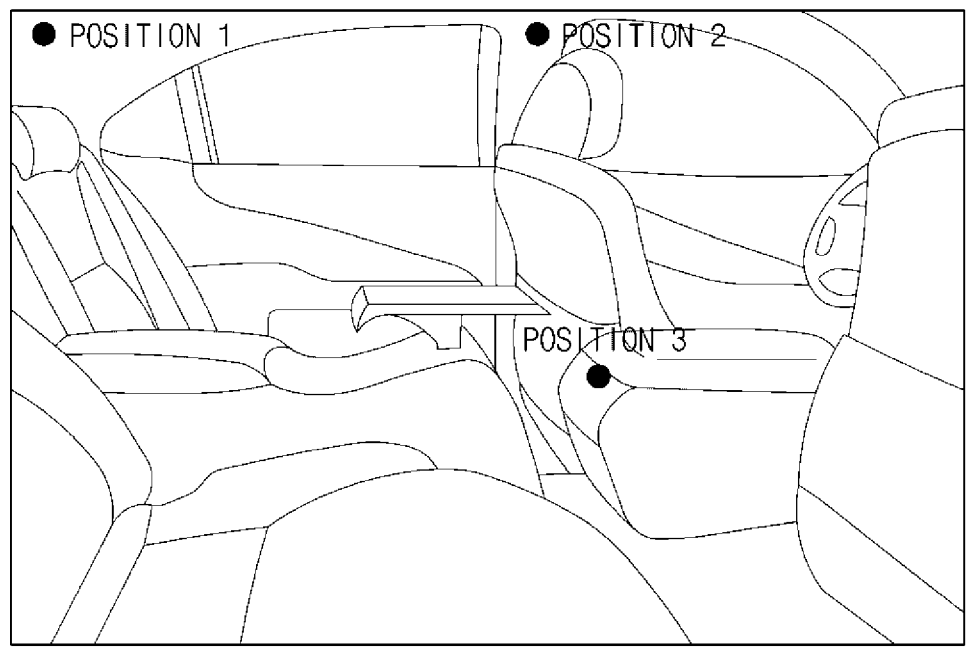
FIG. 4 is a view showing a sensor for sensing a position of a vehicle passenger in a safe exiting assistance system according to an embodiment of FIG. 1.

FIG. 4 is a view showing a sensor for sensing a position of a vehicle passenger in a safe exiting assistance system according to an embodiment of FIG. 1.

In an embodiment of FIG. 4, the position of the passenger, which is sensed by the sensors may be included in the vehicle information sensed in advance in the vehicle. Embodiments of the present disclosure are not limited thereto, the sensors for sensing the position of the passenger may be included in the body detector 110.

The sensors for sensing the position of the passenger may be disposed at an upper side of the rear seat of the vehicle (position 1), an upper side of a front seat (e.g., a driver's seat) (position 2), and a back of a console box (position 3). In addition, the sensors for sensing the position of the passenger may be installed in an armrest, a headliner, or the like. In the embodiment of FIG. 4, the positions of the sensors for sensing the position of the passenger are not limited thereto, and the positions of the sensors may be anywhere in an interior space of the vehicle as long as the sensors face the passenger sitting in the back seat.

Figure 5:
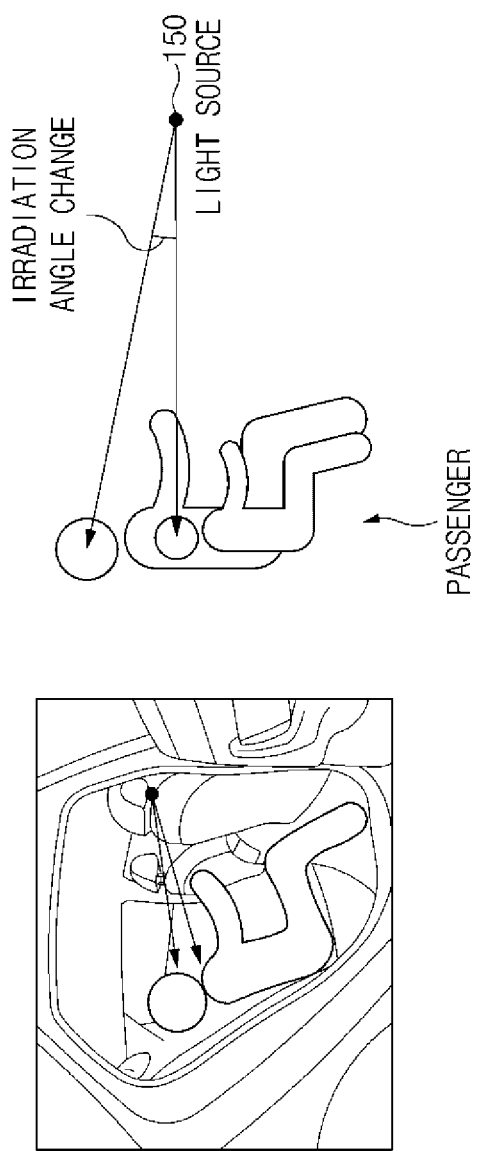
FIG. 5 is a view for illustrating an operation of the controller of FIG. 1.

FIG. 5 is a view for illustrating an operation of the controller 140 of FIG. 1.

The controller 140 according to an embodiment of FIG. 5 shows a case in which an irradiation angle is adjusted by one light source 150. The controller 140 may change the irradiation angle of the light source 150 corresponding to the eye height of the passenger in response to information from the determiner 130. For example, in the case of the passenger with a small sitting height, the controller 140 may adjust the irradiation angle of the light source 150 to a low eye height because the most passengers with the small sitting height has the low eye height. On the other hand, in the case of the passenger with a high sitting height, the controller 140 may adjust the irradiation angle of the light source 150 to a high eye height because the most passengers with the high sitting height has the high eye height.

Figure 6:
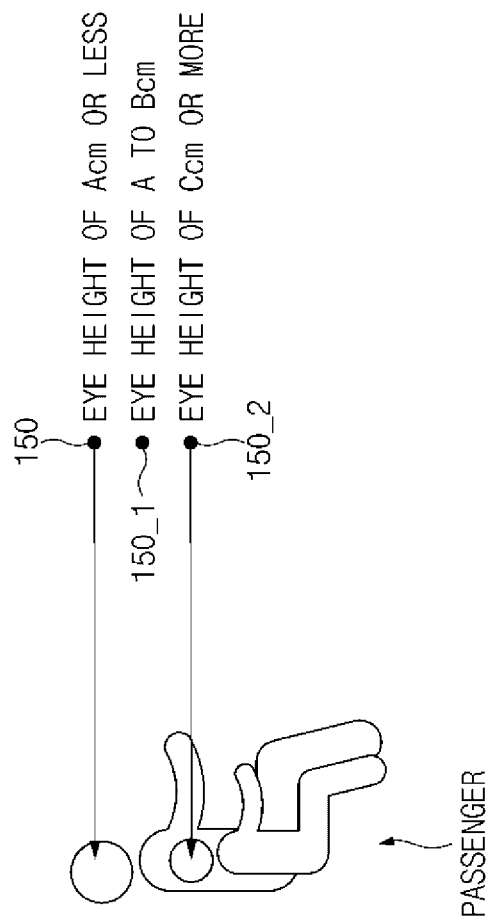
FIG. 6 is another embodiment for illustrating an operation of the controller of FIG. 1.
Figure 6:
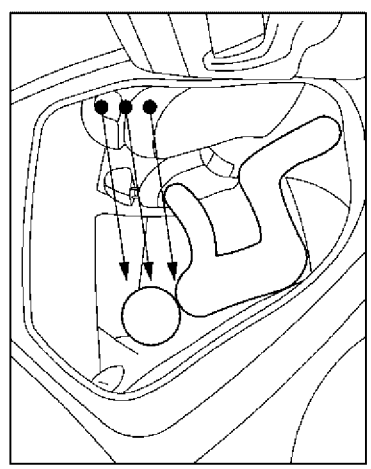

FIG. 6 is another embodiment for illustrating an operation of the controller 140 of FIG. 1.

The controller 140 according to an embodiment of FIG. 6 illustrates a case where one of a plurality of light sources 150, 150_1, and 150_2 is selected corresponding to the eye height of the passenger. The controller 140 may select a position of the light source 150 suitable for the eye height of the passenger among the plurality of light sources 150, 150_1, and 150_2 in response to the information applied from the determiner 130.

In the embodiment of FIG. 6, positions and sections in which the plurality of light sources 150, 150_1 and 150_2 are installed may be set in advance based on the sitting height of the passenger.

For example, in the case of the passenger with the small sitting height, the controller 140 may select the light source 150_2 at the lowest position of the plurality of light sources 150, 150_1, and 150_2 because the most passenger with the small sitting height has the low eye height (A cm or less). In the case of the passenger with a high sitting height, the controller 140 may select the light source 150 at the highest position of the plurality of light sources 150, 150_1, and 150_2 because the most passenger with the high sitting height has the high eye height (C cm or more). In addition, in the case of the passenger with a middle sitting height (eye height of A cm to B cm), the controller 140 may select the light source 150_1 at a middle position of the plurality of light sources 150, 150_1, and 150_2.

In the embodiment of FIG. 6, the plurality of light sources 150, 150_1, and 150_2 having three light sources is described as an example, but the number of light sources is not limited thereto.

Figure 7:
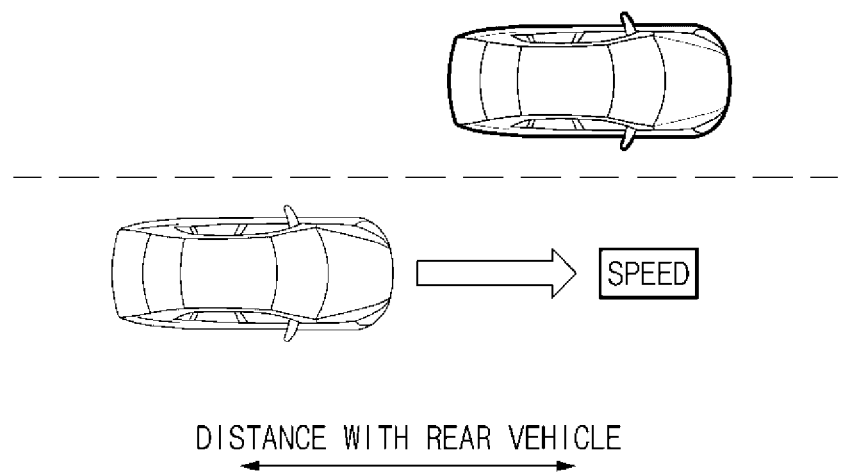
FIG. 7 is still another embodiment for illustrating an operation of the controller of FIG. 1.

FIG. 7 is still another embodiment for illustrating an operation of the controller 140 of FIG. 1.

Referring to FIG. 7, the controller 140 may classify a degree of risk based on the information applied from the determiner 130 when the passenger exits the vehicle. That is, the controller 140 may classify the degree of risk depending on the distance and/or the speed with respect to the object (car, bicycle, person, or the like) approaching from the rear side.

Table 1 below shows an example of classifying a degree of risk Pd corresponding to the distance between the vehicle and the object.

TABLE 1

| Degree of risk (Pd) | 1 | 2 | 3 | 4 |
|---|---|---|---|---|
| Distance | 100 m or more | Less than 100 m~80 m or more | Less than 80~60 m or more | Less than 60 m |

In addition, Table 2 below shows an example of classifying a degree of risk Pv in response to the speed at which the object approaches the vehicle.

TABLE 2

| Degree of risk (Pv) | 1 | 2 | 3 | 4 |
|---|---|---|---|---|
| Speed (Km/h) | Less than 60 | Less than 80~60 or more | Less than 100~80 or more | 100 or more |

As shown in Table 1 above, when the degree of risk based on the distance is defined as Pd, a risk score may be divided into 1 to 4 points depending on the distance. In Table 1, as the point becomes higher, the distance between the vehicle and the object becomes closer. Thus, as the point becomes higher, the degree of risk Pd may be the higher.

Further, as shown in Table 2 above, when the degree of risk based on the speed is defined as Pv, a risk score may be divided into 1 to 4 points depending on the speed. In Table 2, as the point becomes higher, the speed at which the object approaches becomes faster. Thus, as the point becomes higher, the degree of risk Pv may be the higher.

A method of calculating a total risk PT by combining the degree of risk Pd and the degree of risk Pv is as follows.

First, the total risk PT may be calculated by a method (Method 1) of multiplying the points of the degree of risk Pd and the degree of risk Pv (Pd*Pv). As another example, the total risk PT may be calculated by a weighting method (Method 2), as shown in Equation 1 below.

$$PT = a \times Pd + (1-a)Pv \quad \text{[Equation 1]}$$

(where "a" is constant which determines the weight of the distance risk and the speed risk)

As another example, the total risk PT may be calculated by dividing a priority by the distance of the approaching object (Method 3). That is, when the distance to the object is 60 m or more, the priority may be given to the speed risk, and when the distance to the object is less than 60 m, the priority may be given to the distance risk.

Figure 8:
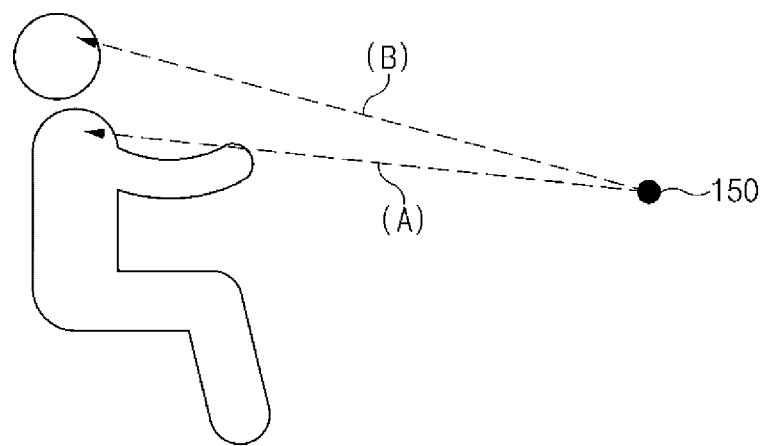
FIGS. 8 and 9 are views for illustrating a change in a light source based on a degree of risk at the controller of FIG. 1.
Figure 9:
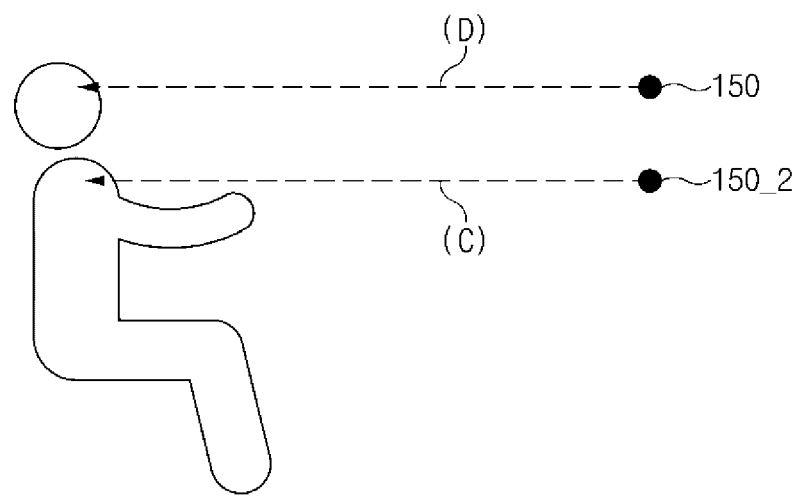

FIGS. 8 and 9 are views for illustrating a change in a light source based on a degree of risk at the controller 140 of FIG. 1.

The controller 140 according to an embodiment of FIGS. 8 and 9 may change irradiation of the light source 150 based on the total risk PT combined with the degree of risk Pd and the degree of risk Pv. For example, the controller 140 may change the irradiation angle and the position of the light source 150 depending on information of the degree of risk for minimizing glare of the passenger. In embodiments of FIGS. 8 and 9, a method of irradiating the light source with reference to Method 1 above will be described.

An embodiment of FIG. 8 shows a case where the controller 140 changes the irradiation angle for one light source 150 depending on the total risk PT.

For example, the controller 140 irradiates the light at a shoulder height away from the eyes to minimize the glare of the passenger as shown in (A) when a point of the total risk PT calculated by Method 1 is within a range of 1 to 8 (relatively low risk range).

On the other hand, the controller 140 irradiates the light as close to the eyes as possible to clearly guide a dangerous situation to the passenger as shown in (B) when a point of the total risk PT calculated by Method 1 is within a range 9 to 16 (relatedly high risk range). As the light of the light source 150 is irradiated closer to the eyes of the passenger, the light may be dazzled and a visual effect on the dangerous situation may increase.

An embodiment of FIG. 9 illustrates a case where the controller 140 changes the positions of the light sources with respect to the plurality of light sources 150 and 150_2 depending on the total risk PT.

For example, the controller 140 selects the light source 150_2 at the shoulder height away from the eyes to minimize the glare of the passenger as shown in (C) when the point of the total risk PT calculated by Method 1 is within the range of 1 to 8 (relatively low risk range). That is, the light source 150_2 at a lower position (far from the passenger's eye) among the plurality of light sources 150 and 150_2 is selected when the degree of risk is low.

On the other hand, the controller 140 irradiates the light as close to the eyes as possible to clearly guide the dangerous situation to the passenger as shown in (D) when the point of the total risk PT calculated by Method 1 is within the range 9 to 16 (relatedly high risk range). That is, the light source 150 at a higher position (disposed at the eyes of the passenger) among the plurality of light sources 150 and 150_2 is selected when the degree of risk is high.

According to another embodiment, the controller 140 may adjust an irradiation amount of the light source differently depending on the total risk PT.

As an example, the controller 140 may change a brightness for one light source 150 depending on the total risk PT. The brightness of the light source 150 corresponding to the total risk PT is as shown in Table 3 below.

TABLE 3

| Total risk (PT) | 1 to 4 | 5 to 8 | 9 to 12 | 13 to 16 |
|---|---|---|---|---|
| Light brightness (Lx) | b | 1.2*b | 1.5*b | 2b |

As shown in Table 3 above, as the total risk Pt is higher (larger point), the controller 140 changes a brightness value (lux value, Lx) "b" of the light source 150 to be brightened.

As another example, the controller 140 may adjust the brightness by changing the number of light sources which turn on among the plurality of light sources 150 and 150_2 depending on the total risk PT. The number of light sources 150 corresponding to the total risk PT is as shown in Table 4 below.

TABLE 4

| Total risk (PT) | 1 to 4 | 5 to 8 | 9 to 12 | 13 to 16 |
|---|---|---|---|---|
| Number of light sources | one | one | two | two |

As shown in Table 4 above, the controller 140 may increase the number of the light source 150 and 150_2 which turn on as the total risk PT is higher (higher point). For example, one light source (e.g., the light source 150_2) may turn on to decrease the amount of radiation when the point of the total risk PT is within the range of 1 to 8 (when the degree of risk is low). Two light sources (e.g., the light sources 150 and 150_2) may turn on to increase the amount of radiation when the point of the total risk PT is within the range of 9 to 16 (when the degree of risk is high).

Figure 10:
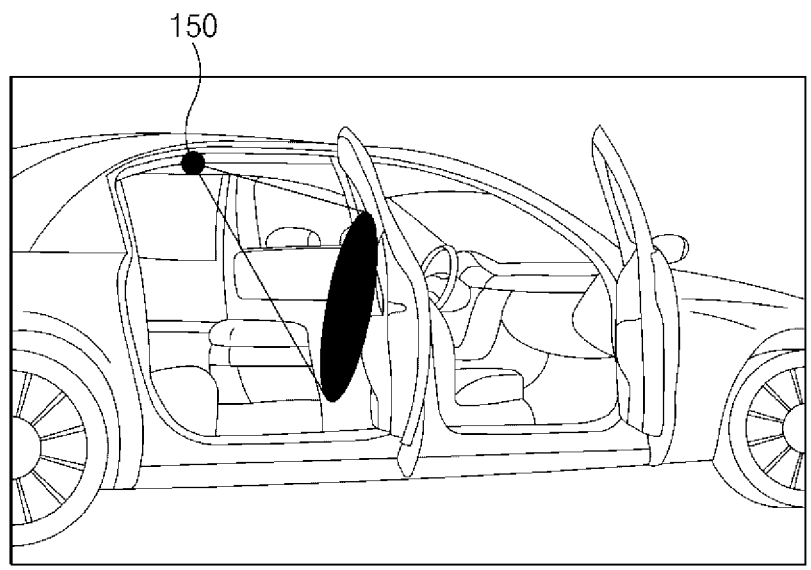
FIGS. 10 and 11 are views for illustrating positioning of the light source of FIG. 1.
Figure 11:
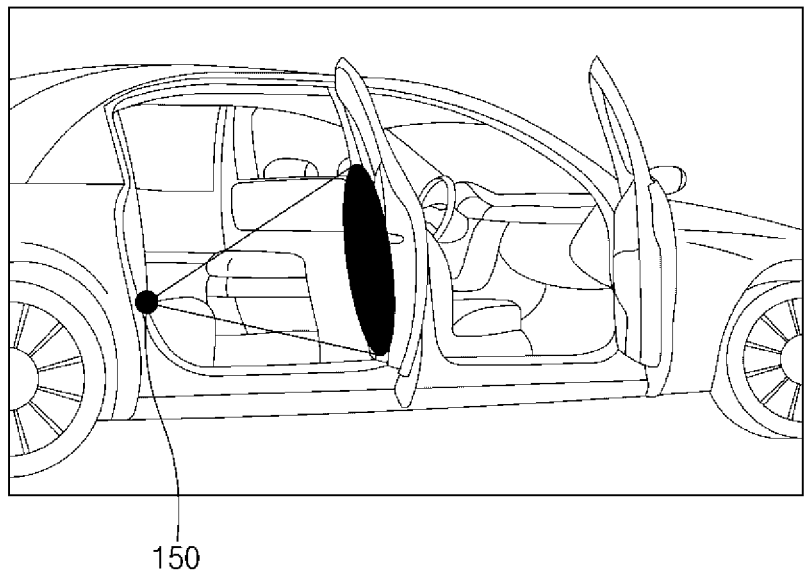

FIGS. 10 and 11 are views for illustrating positioning of the light source 150 of FIG. 1.

FIGS. 10 and 11 are views for displaying a warning phrase or an alert such as an icon using a projection type light source 150.

FIG. 10 shows a method of irradiating the light source to the interior of the vehicle by applying the light source 150 near a roof of the vehicle. FIG. 11 illustrates a method of allowing the light of the light source 150 to be irradiated to the inside of the door when the door of the vehicle is opened.

Figure 12:
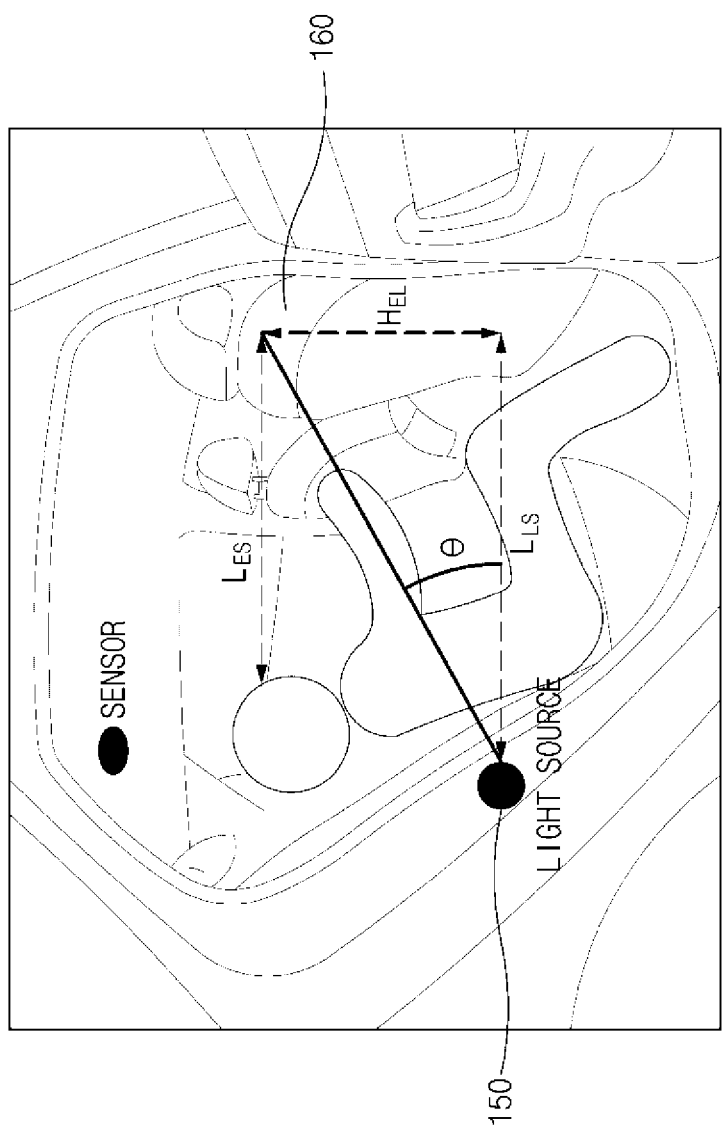
FIG. 12 is a view for calculating an irradiation angle using a projection type light source in the determiner of FIG. 1.

FIG. 12 is a view for calculating an irradiation angle using a projection type light source in the determiner 130 of FIG. 1.

Referring to FIG. 12, the determiner 130 may calculate the irradiation angle of the light source 150 in the vehicle where the passenger gets on based on the vehicle information sensed in the vehicle in advance and physical information sensed by the body detector 110.

For example, the vehicle information sensed in the vehicle in advance may include the position of the B pillar, a distance between the light source 150 and a vehicle seatback 160, the height information of the light source, and the like. Here, when the light source 150 is irradiated to the seatback 160, a position of a seat (a value already known at a design stage) may be used. The distance between the light source 150 and the vehicle seatback 160 may be represented by LLS. The distance between the eye of the passenger and the seatback 160 may be represented by LES.

It is assumed that a display position of the alert that is most appropriate for the passenger is a horizontal position with respect to the eye height. The determiner 130 may obtain an irradiation distance HEL of the light source 150 based on the vehicle information set in the vehicle in advance and the eye height information sensed by the body detector 110. Here, the irradiation distance HEL of the light source 150 represents the distance between the eye and the light source 150. The irradiation distance HEL is a value obtained by subtracting the height value of the light source from the eye height information HE described above.

Therefore, when the irradiation distance HEL and the distance LLS between the light source 150 and the vehicle seatback 160 are known, an irradiation angle Θ of the light source 150 may be obtained as shown in Equation 2 below.

$$\Theta = \tan^{-1}(HEL/LLS) \quad \text{[Equation 2]}$$

The optimal irradiation angle Θ parallel to the eye height may be obtained by Equation 2 above.

Figure 13:
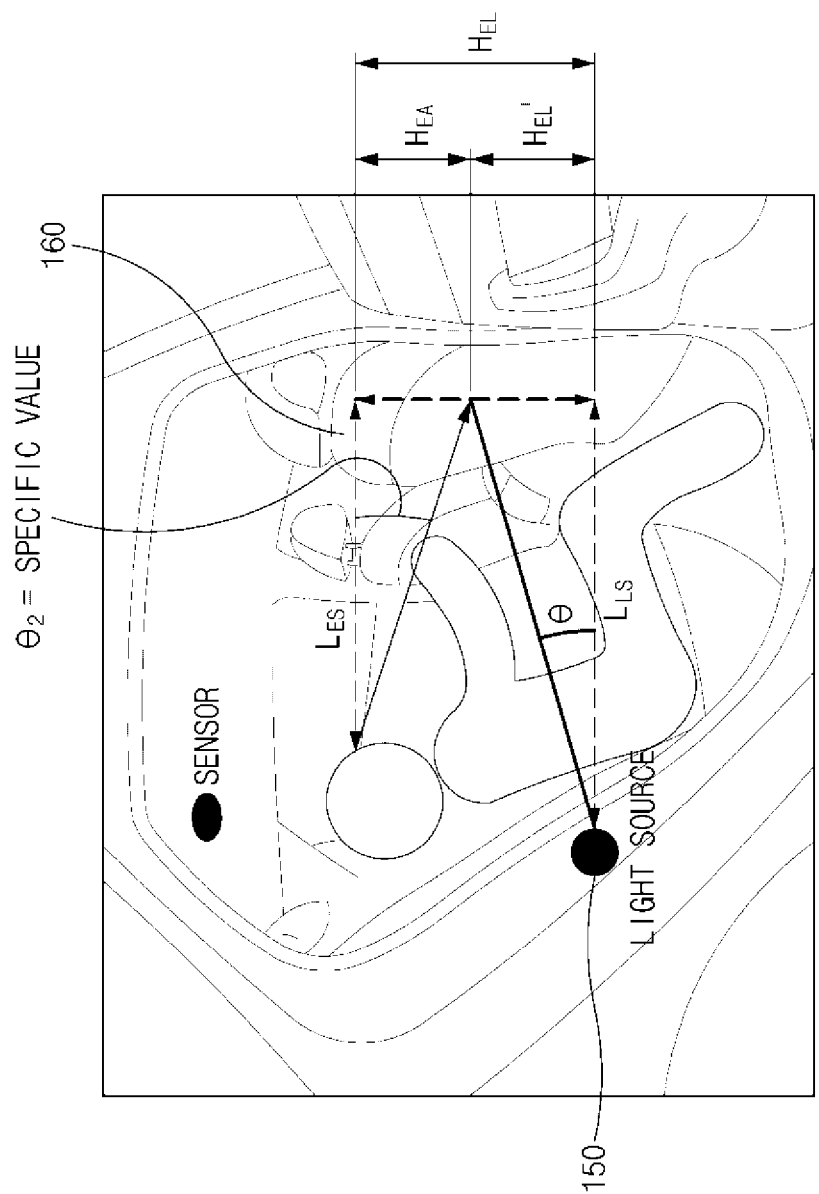
FIG. 13 is another embodiment for calculating an irradiation angle using a projection type light source in the determiner of FIG. 1.

FIG. 13 is another embodiment for calculating an irradiation angle using a projection type light source in the determiner 130 of FIG. 1.

Referring to FIG. 13, it is assumed that the display position of the alert which is most suitable for the passenger is a point forming a specific irradiation angle Θ2 with the eye height. Here, the irradiation angle Θ2 is a specific value because the irradiation angle Θ2 is a value set to an optimal viewing angle. Thus, the distance value of HEA may be obtained using the irradiation angle Θ2. Here, the distance value of HEA is a distance value of a range in which the light is irradiated by the irradiation angle Θ2. Further, when the value of HEA is subtracted from the irradiation distance HEL value, the HEL' distance value may be obtained.

The distance value of the HEA and the distance value of the HEL' are expressed by Equation 3 and Equation 4, respectively, as follows.

$$HEA = LES \tan \Theta 2 \quad \text{[Equation 3]}$$

$$HEL' = HEL - HEA \quad \text{[Equation 4]}$$

As described above, the determiner 130 may calculate the range of the light projected by the optimal irradiation angle by using Equation 3 and Equation 4 above.

Figure 14:
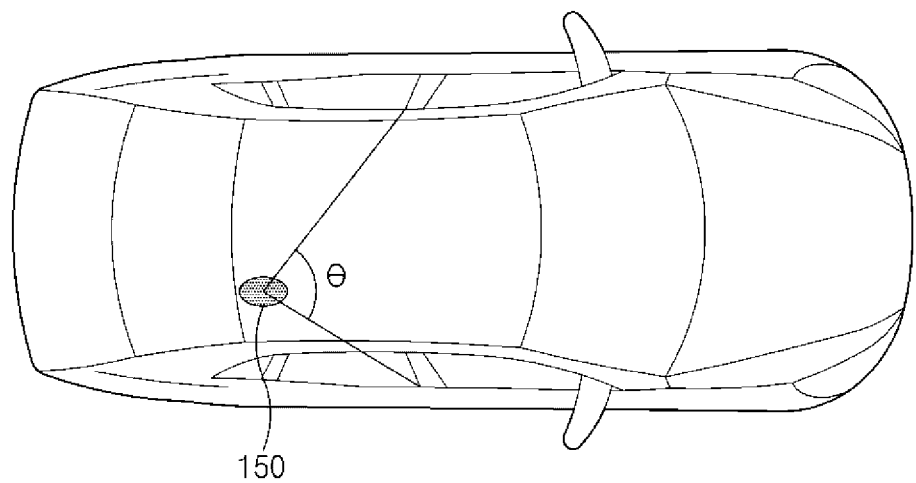
FIG. 14 is a view for illustrating an irradiation range of the light source in embodiments of FIGS. 10 to 13.

FIG. 14 is a view for illustrating an irradiation range of the light source 150 in embodiments of FIGS. 10 to 13.

Referring to FIG. 14, when viewed from a top of the vehicle, the alert of the dangerous situation may be displayed in the range of the irradiation angle Θ of the light source 150. Thus, a visual alert may be displayed freely regardless of the internal position of the vehicle.

Figure 15:
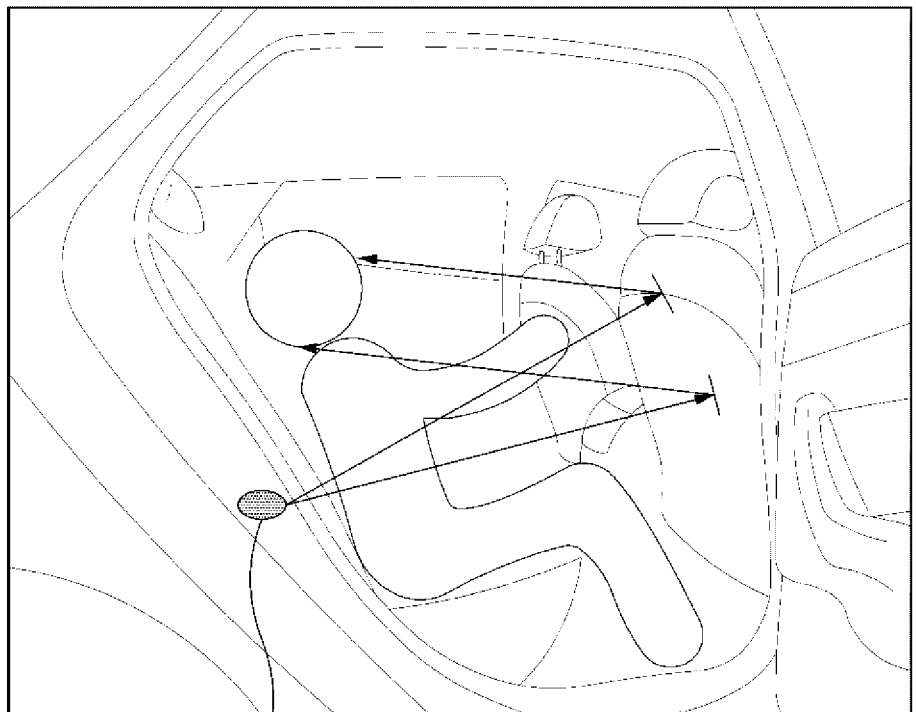
FIG. 15 is a view for illustrating adjustment of a reflection angle of a light source of a projection method in embodiments of FIGS. 10 to 13.

FIG. 15 is a view for illustrating adjustment of a reflection angle of a light source of a projection method in embodiments of FIGS. 10 to 13.

Referring to FIG. 15, the controller 140 may adjust an incident angle and a reflection angle of the light source 150 in case of an emergency in response to the information received from the determiner 130. That is, the controller 140 may adjust the amount of reflected light irradiated to the eyes of the passenger depending on the degree of risk to improve visibility.

For example, the controller 140 may adjust the angle of the reflected light to be illuminated as close as possible to the eyes of the passenger when the speed of another vehicle approaching from the rear side is fast or another vehicle is close to the vehicle where the passenger gets on.

In embodiments of the present disclosure, the warning is visually displayed at the optimal position based on the physical information of the passenger when the passenger exits, thereby ensuring whether the passenger is capable of exiting and improving convenience of the passenger.

Further, embodiments of the present disclosure are for illustrative purposes, those skilled in the art will understand that various changes, modifications, substitutions, and additions may be made hereto within the spirit and scope of the appended claims, and such changes and modifications should be considered to fall within the scope of the following claims.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A safe exiting assistance system comprising:
an object detector configured to detect an object which approaches from a rear side of a vehicle;
a body detector configured to detect physical information of a passenger in the vehicle;
a door opening/closing detector configured to detect door opening or closing information of the vehicle;
a determiner configured to determine whether a situation requires alert to the passenger in response to detection results of the object detector and the door opening/closing detector and to calculate a value sensed by the body detector in response to vehicle information set in advance; and
a controller configured to:
adjust an irradiation angle of a light source to correspond to the physical information when information indicating that the situation requires the alert is received from the determiner, and
when there are several light sources, select a position of the light source to correspond to the physical information, when information indicating that the situation requires the alert is received from the determiner.

2. The safe exiting assistance system of claim 1, wherein the object detector detects at least one of an approaching speed of the object and a distance to the object.

3. The safe exiting assistance system of claim 1, wherein the body detector detects at least one of an eye height of the passenger and a sitting height of the passenger.

4. The safe exiting assistance system of claim 1, wherein the determiner determines the situation in which the alert is necessary when approach of the object within a certain range is confirmed from the object detector and a situation in which a door is open is confirmed from the door opening/closing detector.

5. The safe exiting assistance system of claim 1, wherein the vehicle information includes at least one of a position of a B pillar, a position of an internal object of the vehicle, a height of the light source, a distance between the light source and a seatback of the vehicle, and a position information of a sensor, which senses a position of the passenger.

6. The safe exiting assistance system of claim 1, wherein the body detector detects at least one of an eye height information referring to a distance from a ground to an eye the passenger, a distance information between the eye of the passenger and a B pillar, and a distance information between the eye of the passenger and a seatback of the vehicle.

7. The safe exiting assistance system of claim 1, wherein the controller divides a distance risk based on a distance to the object and a speed risk based on an approaching speed to the vehicle in points.

8. The safe exiting assistance system of claim 7, wherein the controller calculates a total risk by combining the distance risk and the speed risk.

9. The safe exiting assistance system of claim 8, wherein the total risk is calculated by multiplying a point of the distance risk by a point of the speed risk.

10. The safe exiting assistance system of claim 8, wherein the total risk is calculated by assigning a weight to the distance risk and the speed risk.

11. The safe exiting assistance system of claim 8, wherein the total risk is calculated by dividing a priority by distance to the object.

12. The safe exiting assistance system of claim 11, wherein the controller gives the priority to the speed risk when the distance to the object is greater than or equal to a specific distance and gives the priority to the distance risk when the distance to the object is less than the specific distance.

13. The safe exiting assistance system of claim 8, wherein the controller adjusts the irradiation angle of the light source to radiate the light at a position far from an eye of the passenger when the point of the total risk is within a specific range, and wherein the controller adjusts the irradiation angle of the light source to radiate the light closer to the eye of the passenger when the point of the total risk is more than the specific range.

14. The safe exiting assistance system of claim 8, wherein the controller selects a first light source far from an eye of the passenger when the point of the total risk is within a specific range, and wherein the controller selects a second light source disposed near the eye of the passenger when the point of the total risk is more than the specific range.

15. The safe exiting assistance system of claim 8, wherein the controller differently adjusts at least one of an amount of irradiation and a brightness of the light source depending on the total risk.

16. The safe exiting assistance system of claim 15, wherein the controller increases the number of light sources which turn on as the point of the total risk is higher.

17. The safe exiting assistance system of claim 1, wherein the light source emits the light to at least one of an interior of the vehicle and an inner side of a door for indication of the alert to the passenger to display a warning when the passenger exits.

18. The safe exiting assistance system of claim 1, wherein the light source adjusts the irradiation angle in response to an eye height of the passenger by control of the controller.

19. The safe exiting assistance system of claim 1, wherein the light source is provided in the plural and one of a plurality of light sources is selected in response to an eye height of the passenger.

20. The safe exiting assistance system of claim 1, wherein the determiner calculates the irradiation angle of a projected light source corresponding to distance information between an eye of the passenger and the light source and a distance between the light source and a seatback of the vehicle.

* * * * *